United States Patent
Jessberger et al.

(10) Patent No.: US 6,921,012 B2
(45) Date of Patent: Jul. 26, 2005

(54) METHOD OF VIBRATION WELDING AND VIBRATION WELDING TOOL FOR USE THEREIN

(75) Inventors: Thomas Jessberger, Asperg (DE); Matthias Mueller, Nordheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 59 days.

(21) Appl. No.: 10/390,156

(22) Filed: Mar. 18, 2003

(65) Prior Publication Data

US 2004/0020969 A1 Feb. 5, 2004

(30) Foreign Application Priority Data

Mar. 18, 2002 (DE) .......................................... 102 11 875

(51) Int. Cl.[7] .......................... B23K 1/06; B23K 5/20; B23K 20/10
(52) U.S. Cl. ............................... 228/110.1; 228/112.1; 228/1.1; 228/2.1; 156/580.2
(58) Field of Search ........................... 228/110.1, 112.1, 228/178, 182, 1.1, 2.1; 156/73.1, 580.1, 580.2

(56) References Cited

U.S. PATENT DOCUMENTS

| | | | | |
|---|---|---|---|---|
| 4,030,657 A | * | 6/1977 | Scheffer | 228/1.1 |
| 4,776,509 A | * | 10/1988 | Pitts et al. | 228/179.1 |
| 5,193,732 A | * | 3/1993 | Interrante et al. | 228/1.1 |
| 6,152,350 A | * | 11/2000 | Hayashi et al. | 228/102 |
| 6,329,607 B1 | * | 12/2001 | Fjelstad et al. | 174/261 |

* cited by examiner

Primary Examiner—Colleen P. Cooke
(74) Attorney, Agent, or Firm—Crowell & Moring LLP

(57) ABSTRACT

To vibration weld two components (1, 2), which are to be joined together on a welding surface (8), a vibrational movement (7) is transmitted from a tool (3) to the vibrating component (1) while the other component (2) is fixed. During the procedure, the tool (3) presses the vibrating component (1) onto the fixed component (2) in a direction (9) substantially perpendicular to the vibrational movement (7). To avoid the need for a structured surface on the tool (3) in order to transmit the vibrational movement to the vibrating component, which structured surface could leave marks on the vibrating component, the vibrating component (1) has at least one relief-like depression (5) or elevation (6), which transmits the vibrational movement from the tool (3) to the vibrating component (1). A tool for vibration welding two components has at least one elevation (6) or depression (5), which matingly engages a depression (5) or elevation (6) on the component (1) to be vibrated to transmit the vibrational movement (7) of the tool (3).

4 Claims, 1 Drawing Sheet

METHOD OF VIBRATION WELDING AND VIBRATION WELDING TOOL FOR USE THEREIN

The present invention relates to a method of vibration welding and to a tool for carrying out the method of the invention.

In vibration welding, the workpieces to be joined are moved against one another, particularly in such a way such that one component is held fixed and one component executes the vibrational movement. The fixing of the workpieces on the welding tool and the transmission of the vibrational movement and the contact pressure are typically performed at the welding edge. To transmit the welding movement, the welding tool has rhomboidal elevations in the region of the welding edge, which leave marks on the component surface after the welding procedure. In particular for high-value components, for example, decorative covers for air filters or engine blocks, these rhomboidal imprints are considered objectionable.

As an alternative to this, additional holding elements may be used to fix the component to be vibrated on the tool. However, these elements may come loose due to the vibration. The additional components which are required also necessitate increased expenditures for attachment and removal and result in additional expense.

SUMMARY OF THE INVENTION

It is an object of the present invention to provide an improved method of vibration welding synthetic resin components together.

Another object of the invention is to provide a vibration welding method which satisfies high requirements for surface quality of the welded components.

A further object of the invention is to provide an improved tool for vibration welding components together.

In accordance with one aspect of the invention, these and other objects are achieved by providing a method of vibration welding two components, which are to be joined to one another at a welding surface, wherein a vibrational movement is transmitted from a tool to a vibrating component and the other component is fixed; wherein the tool presses the vibrating component against the fixed component in a direction substantially perpendicular to the vibrational movement, and wherein the vibrating component is provided with at least one depression or elevation by which vibrational movement is transmitted from the tool to the vibrating component.

In yet another aspect of the invention, the objects are achieved by providing a tool for vibration welding two components which are to be joined together at a welding surface, wherein a vibrating component is arranged on the tool and the other component is fixed, and wherein the tool has at least one elevation or depression which matches a depression or elevation on the vibrating component and interacts therewith to transmit a vibrational movement from the tool to the component.

By transmitting the vibrational movement via relief-like depressions or elevations in the vibrating component, the surface of the tool does not have to be textured in the region of the welding surface. The tool merely transmits the contact pressure, which typically acts approximately perpendicularly to the welding surface, in the region of the welding surface. The tool may engage the component with a flat surface to transmit the contact pressure, so that no imprints or marks are produced on the component. The transmission of the vibrational movement may occur both via elevations and/or via depressions on the component.

The welding surface is formed on a peripheral welding edge, which is spaced a distance from the depression(s) or elevation(s). However, it may also be advantageous for the vibrating component to have depressions having a surface which faces away from the tool and toward the other component and which serves as the welding surface. The depression or elevation may advantageously be comprised of lettering or a logo. However, other elevations or depressions on the component may be used for transmitting the vibrational movement.

The invention also relates to a tool for vibration welding two components which are to be joined to one another at a welding surface, whereby the vibrating component is positioned on the tool and the other component is mounted in a fixed position. The tool has at least one elevation or depression which is aligned with a depression or elevation of the component to be vibrated and interacts therewith to transmit the vibrational movement of the tool to the component. To reduce the forces acting on the depression or elevation, however, it may be advantageous for a large part or all of the relief-like depressions or elevations positioned on the vibrating component to be used for transmitting the vibrational movement to the vibrating component. Particularly to compensate for tolerances, the position of the tool relative to the vibrating component is fixed via at least two elevations which interact with depressions, the width of the elevations in the direction of the vibrational movement being smaller than the width of the associated depressions. In this case, the depressions may be positioned both on the workpiece and on the tool.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
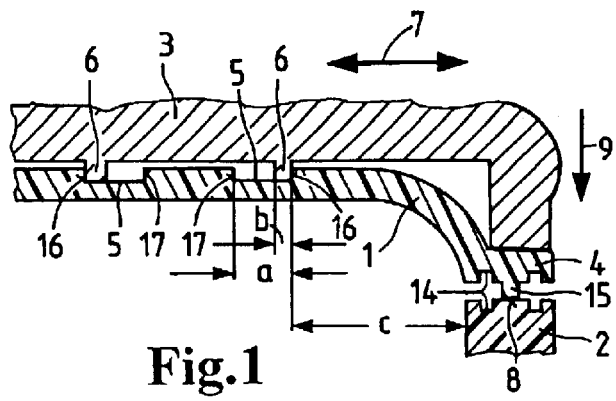
FIG. 1 is a schematic sectional illustration of a tool according to the invention and the two components to be joined.

FIG. 1 shows two components 1 and 2 which are to be joined to one another at a welding edge 4 through vibration welding. Grooves 14 which extend in the lengthwise direction of the welding edge and a web 15 are positioned on the welding edge 4 adjacent the welding surface 8. During welding, the material of the web 15 is melted and flows into the grooves 14 positioned at the sides of the web 15. This facilitates a good welded joint. The tool 3 presses the vibrating component 1 in the direction of the arrow 9 against the fixed component 2 along the welding edge 4.

The component 1 has relief-like depressions 5, which are spaced a distance c from the welding edge. The tool 3 has elevations 6 which project into the depressions 5 of component 1. The vibrational movement 7, which is oriented approximately perpendicularly to the contact pressure 9, is transmitted from the tool 3 to the vibrating component 1.

The vibrational movement 7 is transmitted via the elevations 6 and the depressions 5.

For this purpose, the elevations 6 each engage against a lateral (viewed in the direction of the vibrations) wall 16 of the depressions 5; whereby the two lateral walls 16 are the lateral walls of the depressions 5 which face away from one another, i.e, which are on opposite sides of the depressions. However, it may also be advantageous for the elevations 6 to rest against facing lateral walls 17 of the depressions 5, i.e. on adjacent sides of the depressions.

The elevations 6 have a width b, measured in the direction of the vibrational movement 7, which is less than the width a of the depressions 5 measured in the same direction.

Figure 2:
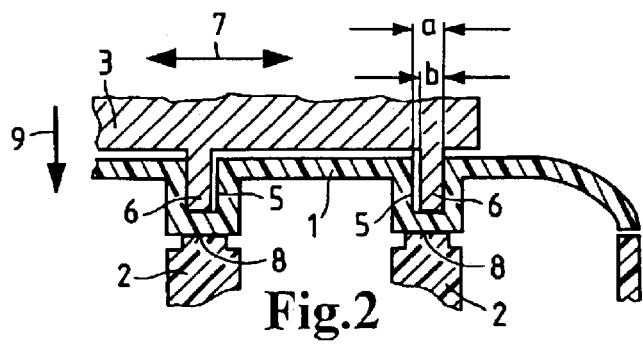
FIG. 2 is a schematic sectional view of an alternative embodiment of the invention.

A component 1 and a component 2 to be joined together are illustrated in FIG. 2, in which depressions 5 are positioned in component 1 which are used to transmit the vibrational movement 7 from the tool 3 to the component. For this purpose, elevations 6 of the tool 3 project into the depressions 5. The welding surface 8, at which the component 1 is to be joined to the fixed component 2, is positioned on the side of the depression 5 facing away from the tool 3. Therefore, both the contact pressure in a direction 9 and the vibrational movement in the direction 7 are transmitted via the elevation 6. To avoid tolerance problems, the width "b" of the elevation 6 is also less than the width "a" of the depression 5 in this case, the difference being relatively small in order to maintain a sufficiently large contact surface for transmitting the contact pressure to the elevation 6.

Figure 3:
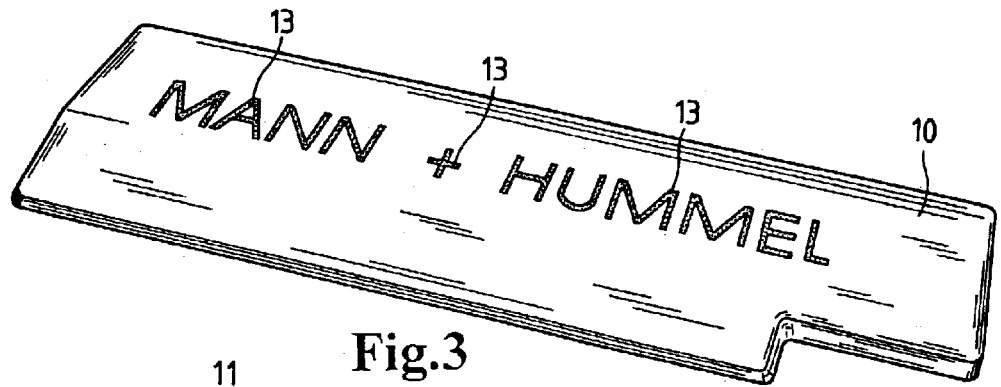
FIG. 3 is a perspective view of a component which is to be caused to vibrate.
Figure 4:
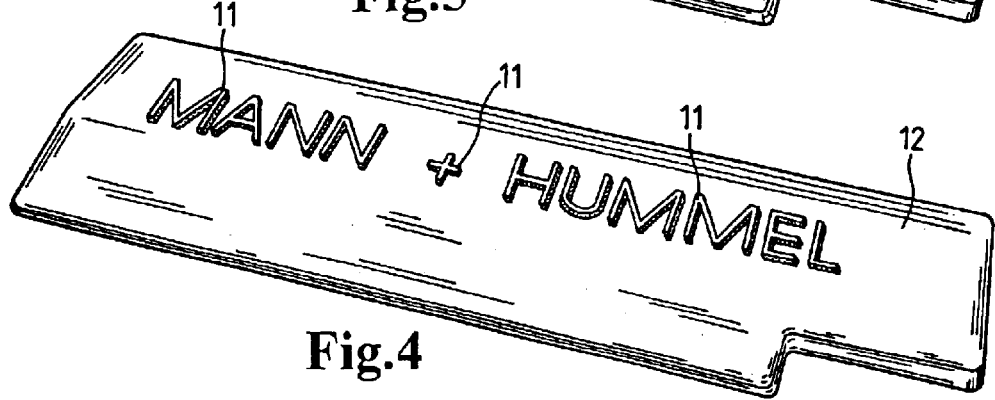
FIG. 4 is a perspective view of a variant embodiment of a component corresponding to FIG. 3.

FIGS. 3 and 4 depict components 10 and 12 which are to be vibrated. Components 10 and 12 may, for example, be decorative covers for air filters or engine blocks in motor vehicles. The component 10 to be vibrated, illustrated in FIG. 3, has lettering in the form of relief-like depressions 13. Elevations of the tool project into the relief-like depressions 13 during the vibration welding procedure, by means of which the vibrational movement is transmitted from the tool to the vibrating component 10. FIG. 4 illustrates a vibrating component 12 having lettering which is formed as relief-like elevations 11 and by means of which the vibrational movement is transmitted by depressions on the tool.

During welding of two components, one component is associated with the tool, and the tool is provided with depressions or elevations corresponding to elevations or depressions on the component. The tool performs a vibrational movement which is transmitted to the component via the elevations or depressions. Simultaneously, the tool presses the welding edge of the vibrating component 1 against the welding edge of the fixed component 2. In this way, the components 1 and 2 are welded to one another without any need for a textured or structured surface on the tool 3, which could leave objectionable marks on the welding edge 4 after the vibration welding procedure, in order to transmit the vibrational movement 7 to the component.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of vibration welding two components, which are to be joined to one another at a welding surface, wherein a vibrational movement is transmitted from a tool to a vibrating component and the other component is fixed; wherein the tool presses the vibrating component against the fixed component in a direction substantially perpendicular to the vibrational movement; wherein the vibrating component is provided with at least one force-transmitting depression or elevation by which vibrational movement is transmitted from the tool to the vibrating component, and wherein the vibrating component is provided with welding surface depressions having a surface which faces away from the tool and toward the other component and which serves as the welding surface of the vibrating component.

2. A method of vibration welding two components, which are to be joined to one another at a welding surface, wherein a vibrational movement is transmitted from a tool to a vibrating component and the other component is fixed; wherein the tool presses the vibrating component against the fixed component in a direction substantially perpendicular to the vibrational movement; wherein the vibrating component is provided with at least one depression or elevation by which vibrational movement is transmitted from the tool to the vibrating component, and wherein the depression or elevation is in the form of lettering or a logo.

3. A method according to claim 2, wherein the welding surface is formed on a peripheral welding edge of the vibrating component, and wherein said peripheral edge is spaced a distance from said depression or elevation.

4. A tool for vibration welding two components which are to be joined together at a welding surface, wherein a vibrating component is mounted on the tool and the other component is fixed, and wherein the tool has at least one elevation or depression which interlockingly engages a depression or elevation on the vibrating component to transmit a vibrational movement from the tool to the component, wherein the tool is fixed in position relative to the vibrating component by at least two elevations which engage associated depressions, and wherein said elevations have a width (b) in the direction of the vibrational movement which is less than the width (a) of the associated depressions.

* * * * *